(12) United States Patent
Brecl et al.

(10) Patent No.: US 12,388,786 B2
(45) Date of Patent: Aug. 12, 2025

(54) EFFICIENT PROVISIONING OF INTERNET CIRCUIT AND SECURE DOMAIN NAME SYSTEM

(71) Applicant: Level 3 Communications, LLC, Broomfield, CO (US)

(72) Inventors: Peter Brecl, Highlands Ranch, CO (US); David Sanford, Clayton, NC (US)

(73) Assignee: Level 3 Communications, LLC, Denver, CO (US)

( * ) Notice: Subject to any disclaimer, the term of this patent is extended or adjusted under 35 U.S.C. 154(b) by 193 days.

(21) Appl. No.: 18/327,953

(22) Filed: Jun. 2, 2023

(65) Prior Publication Data

US 2023/0396584 A1 Dec. 7, 2023

Related U.S. Application Data

(60) Provisional application No. 63/365,866, filed on Jun. 5, 2022.

(51) Int. Cl.
*H04L 61/4511* (2022.01)
*H04L 9/40* (2022.01)

(52) U.S. Cl.
CPC ...... *H04L 63/0236* (2013.01); *H04L 61/4511* (2022.05); *H04L 63/101* (2013.01)

(58) Field of Classification Search
None
See application file for complete search history.

(56) References Cited

U.S. PATENT DOCUMENTS

| | | | |
|---|---|---|---|
| 10,230,691 B2 | 3/2019 | Cathrow | |
| 2008/0098472 A1* | 4/2008 | Enomoto | H04L 63/029 |
| | | | 726/12 |
| 2016/0294877 A1* | 10/2016 | Xie | H04L 67/02 |
| 2017/0054758 A1* | 2/2017 | Maino | H04L 45/64 |
| 2017/0222978 A1* | 8/2017 | Cathrow | H04L 63/0236 |
| 2017/0264686 A1* | 9/2017 | Sella | H04L 67/53 |
| 2019/0058656 A1* | 2/2019 | Gundersen | H04L 41/22 |
| 2019/0199822 A1* | 6/2019 | Desbureaux | H04L 67/56 |
| 2020/0177548 A1 | 6/2020 | Devarajan | |
| 2020/0396127 A1* | 12/2020 | Lochhead | H04L 41/0806 |
| 2023/0090829 A1* | 3/2023 | Raza | H04L 61/2514 |
| | | | 709/245 |
| 2023/0396583 A1* | 12/2023 | Gurney | H04L 63/101 |
| 2024/0163253 A1* | 5/2024 | Neystadt | H04L 61/4511 |

FOREIGN PATENT DOCUMENTS

EP 3334129 6/2018

OTHER PUBLICATIONS

International Search Report and Written Opinion of the International Searching Authority, dated Aug. 25, 2023, Int'l Appl. No. PCT/US2023/067827, Int'l Filing Date Jun. 2, 2023; 12 pgs.

* cited by examiner

*Primary Examiner* — Joshua Joo

(57) ABSTRACT

The present application describes systems and methods for automatically provisioning a domain name system (DNS) firewall service for an Internet circuit. In examples, customer premises equipment and a DNS firewall system are automatically configured to work with the Internet circuit without requiring technical knowledge or intervention by a customer.

6 Claims, 6 Drawing Sheets

EFFICIENT PROVISIONING OF INTERNET CIRCUIT AND SECURE DOMAIN NAME SYSTEM

CROSS-REFERENCE TO RELATED APPLICATIONS

This application claims the benefits of U.S. Provisional Application No. 63/365,866 filed Jun. 5, 2022, entitled "Efficient Provisioning of Internet Circuit and Secure Domain Name System," which is incorporated herein by reference in its entirety.

BACKGROUND

Many small businesses are dependent on computing and access to the Internet to compete in the modern marketplace. In addition, protection from unauthorized or ill-advised access from a business's network to prohibited web sites is desirable. However, many small business owners lack technical expertise to configure equipment or securely control employees' online activities. It is with respect to this general technical environment that aspects of the present application may be directed.

SUMMARY

The present application describes systems and methods for efficient provisioning of Internet circuits and a secure domain name system.

For example, aspects of the present application include a method comprising: receiving, at a provider configuration system of a network, a request from a customer to provision an Internet circuit and to provision and a domain name system (DNS) firewall system for the Internet circuit, wherein the request includes customer information; assigning an Internet protocol (IP) address space to the Internet circuit; causing the Internet circuit to be provisioned using the customer information and the assigned IP address space; automatically, based on receiving the request to provision the DNS firewall system for the Internet circuit, causing tenant data for the customer to be stored at the DNS firewall system, wherein the tenant data comprises at least the assigned IP address space; and causing DNS requests received from the assigned IP address space to be processed by the DNS firewall system.

In another example, aspects of the present application include a method comprising: receiving, from a provider configuration system of a network and at a domain name system (DNS) firewall system, a request to instantiate the DNS firewall system for an Internet circuit, wherein the request comprises customer information and an assigned Internet protocol (IP) address space for the Internet circuit; automatically extracting the customer information and the assigned IP address space from the request; automatically storing tenant data for the customer at the DNS firewall system, wherein the tenant data comprises at least the assigned IP address space; receiving, by the DNS firewall system, a first DNS request from the assigned IP address space; and processing, by the DNS firewall system, the first DNS request, wherein the processing comprises: determining that the first DNS request includes a first domain that is in a first category; determining whether the first category is permitted for the customer; when the first category is permitted for the customer, causing the first DNS request to be resolved to a first IP address associated with the first domain; and when the first category is not permitted for the customer, causing the first DNS request to be rejected.

In another example, aspects of the present application include a system comprising at least one processor; and memory, operatively connected to the at least one processor and storing instructions that, when executed by the at least one processor, cause the system to perform a method. In examples, the method comprises: receiving, at a provider configuration system of a network, a request from a customer to provision an Internet circuit and to provision a domain name system (DNS) firewall system for the Internet circuit, wherein the request includes customer information; assigning an Internet Protocol (IP) address space to the Internet circuit; causing the Internet circuit to be provisioned using the customer information and the assigned IP address space; automatically, based on receiving the request to provision the DNS firewall system for the Internet circuit, causing tenant data for the customer to be stored at the DNS firewall system, wherein the tenant data comprises at least the assigned IP address space; and causing DNS requests received from the assigned IP address space to be processed by the DNS firewall system.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the Figures can comprise one or more machines or devices that are operatively connected to cooperate in order to provide the described system functionality. The following detailed description is therefore not to be taken in a limiting sense, and the scope of the present disclosure is defined by the appended claims and their equivalents.

Figure 1:
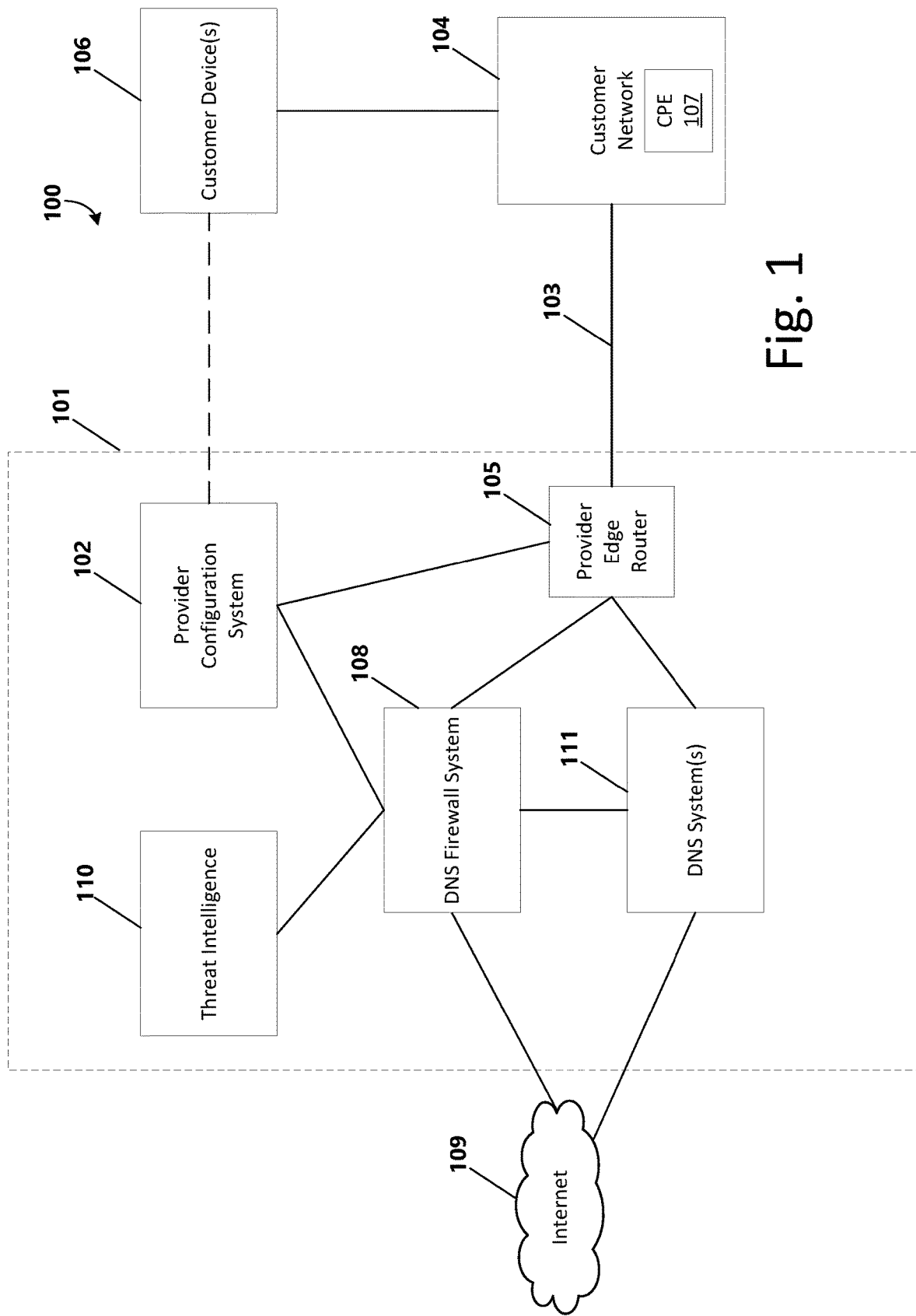
FIG. 1 is a block diagram depicting an example system according to aspects of the present application.

FIG. 1 discloses an example system 100 according to aspects of the present disclosure. A provider configuration system 102 may be provided by an Internet service provider or other network provider to allow customers to arrange for network connectivity (e.g., an Internet circuit 103 between customer network 104 and a provider edge router 105 on network 101 to permit customer device(s) 106 operating on or connected to customer network 104 access to a wide area network, such as the Internet 109). It will be understood that all connections between systems depicted with respect to FIG. 1 can be wired or wireless and may include various intervening devices and systems.

The provider configuration system 102 may provide a customer portal, including a user interface, to allow Internet connectivity to be ordered by, and then provisioned for, a customer. For example, the provider configuration system 102 may be operatively connected to one or more customer device(s) 106 (e.g., through a third-party wired or wireless connection prior to the customer Internet circuit 103 being provisioned). In examples, after the customer Internet circuit 103 is provisioned, the same or different customer device(s) 106 may connect to the Internet 109 through customer network 104, customer Internet circuit 103, and provider edge router 105. In examples, the customer network 104 comprises at least one device referred to as customer premises equipment (CPE) 107. In examples, CPE 107 may comprise a network address translation (NAT) device (or router with NAT capabilities) that assigns Internet protocol (IP) addresses to customer devices 106 on the customer network 104 and routes messages into and out of customer network 104.

In examples, the provider network 101 may also provide a domain name system (DNS) firewall system 108. DNS firewall system 108 may, in examples, provide a DNS firewall service to filter DNS requests from customer networks, such as customer network 104. The DNS firewall system 108 may permit or deny access to particular Internet sites (or other network locations) by customer device(s) 106. For example, DNS firewall system 108 may maintain customizable configurations for multiple customers (each customer being a tenant of the DNS firewall system 108). The configuration may include customer-specific instructions related to categories of Internet sites, such as social media, news, sports, entertainment, etc. For example, a first customer may allow customer devices connected to its network to access social media sites, while another customer may choose to ban such access from its customer network.

When a customer device attempts to access the Internet 109 via Internet circuit 103, a browser on the customer device may issue a DNS request to translate a domain name (e.g., www.example.com) to a particular IP address so that the desired site can be reached. When the DNS firewall system 108 receives a DNS request from a customer network 104 to resolve a particular domain name to an IP address, the DNS firewall system may first determine a category for the particular domain name, determine whether that category of domain is permitted by that customer network to be accessed, and either cause the request to be resolved (e.g., by returning an IP address for the domain) or reject the request (if the domain is in a prohibited category for that customer network). DNS firewall system 108 may also be operatively connected to a threat intelligence system 110 and/or one or more separate DNS system(s) 111, as discussed further herein.

Figure 2:
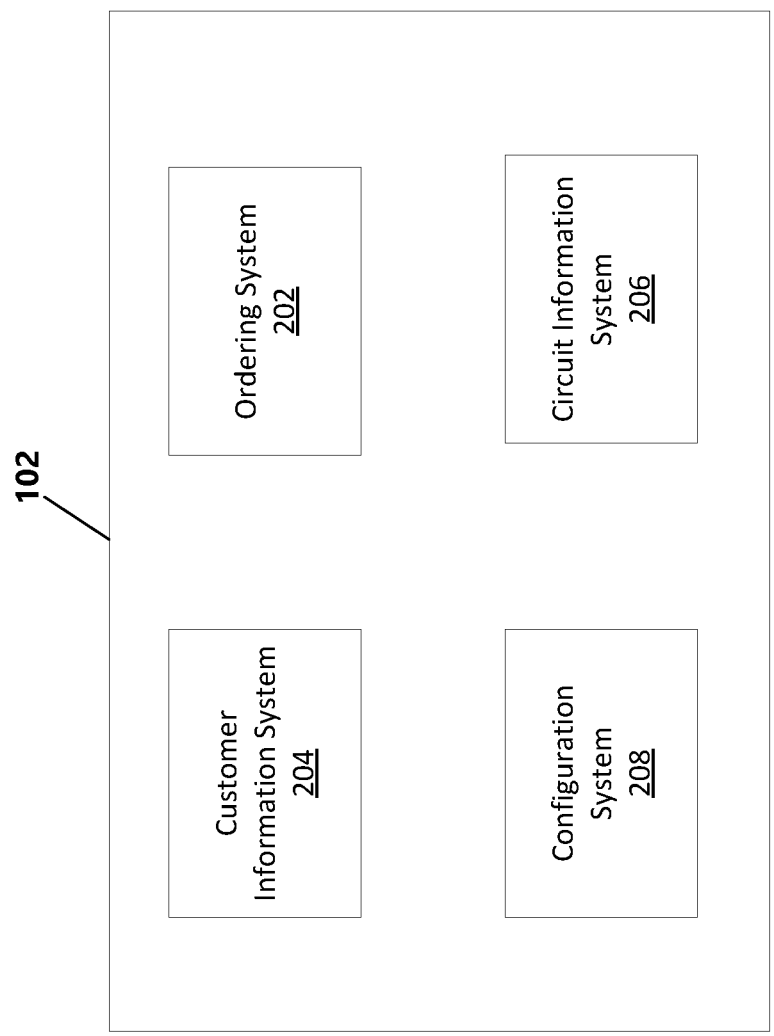
FIG. 2 is a block diagram depicting an example implementation of the provider configuration system of FIG. 1.

A nonexclusive example of the provider configuration system 102 is depicted at FIG. 2. In the example provider configuration system 102, an ordering system 202, customer information system 204, circuit information system 206, and configuration system 208 may be provided. As discussed, any of the systems of provider configuration system 102 may be combined or distributed across one or many physical devices operatively connected by wired or wireless connections in an implementation combining software and hardware.

In examples, ordering system 202 may comprise a customer portal to permit customers of network 101 to order certain products and services. For example, the ordering system 202 may provide one or more user interface(s) for display on a device (such as customer device 106). In examples, a customer may provide (through such user interface(s)) customer information, such as customer name, physical location of the customer, whether the customer is providing its own customer premises equipment 107 or needs it to be delivered to the customer as part of an ordered service, etc. Among other things, the ordering system 202 may collect the information needed from a customer to provision a new Internet circuit 103 between a provider edge router 105 of the network 101 and the customer network 104 (including CPE 107).

Customer information system 204 may comprise one or more data store(s) to store customer information, e.g., the customer information received through the ordering system 202. In some examples, customer information stored in customer information system 204 may be received or retrieved from other computing systems of the provider. For example, if the customer is ordering an Internet circuit 103 from the provider using ordering system 202, the customer may already be a customer of other products/services of the provider, and information about the customer may already be stored in, or accessible to, customer information system 204. For example, the customer may already have an Internet circuit, but may be ordering an additional Internet circuit 103. In this instance, the ordering system may (e.g., based on a previously stored account identifier) retrieve the customer information from the customer information system 204 as part of the ordering process for the new Internet circuit 103.

Circuit information system 206 may, in examples, store, or be configured to retrieve from one or more other network systems, information about the network 101, including existing Internet circuits, available ports on provider edge router(s) 105, available IP address space(s) for assignment to a new Internet circuit 103, etc. Circuit information system 206 may be used by ordering system 202 to provide information about the nearest available provider edge router(s) 105 for a particular customer (e.g., based on the customer information received through ordering system 202). Circuit information system 206 may also cooperate with configuration system 208, as described below.

Configuration system 208 may, in examples, cause the services ordered through ordering system 202 to be provisioned within network 101. For example, when ordering system 202 receives a request from a customer for a new Internet circuit 103, the configuration system 208 may cooperate with the configuration information system 206 to determine the most advantageous way to provision the new Internet circuit 103. For example, configuration system 208 may, in examples, identify one or more available port(s) on an existing provider edge router 105 for the new Internet circuit 103. In other examples, the configuration system 208 may determine that a new provider edge router 105 should be added to network 101 (either in a new location or at an existing location) in order to accommodate the new Internet circuit 103. Configuration system 208 may also cause one or more workflows to be initiated to cause technicians to design or implement the new Internet circuit 103. Configuration system 208 may also assign the IP address space to the new Internet circuit 103 (e.g., assigning a first IP address of the assigned IP address space to the CPE 107 and a second IP address of the assigned IP address space to the provider edge router 105). In examples, configuration system 208 may automatically cause the provider edge router 105 to be configured to advertise the IP addresses of the assigned IP address space.

In examples, configuration system 208 may also cause CPE 107 to be automatically configured. In some examples, the provider of network 101 will also provide the CPE 107 to the customer, and the identification of the CPE (e.g., device type, MAC address, etc.) may be assigned by the configuration system 208 and stored in the customer information system 204. For example, if the provider of network 101 is also providing the CPE 107 to the customer as part of the order for the new Internet circuit 103, the CPE 107 may be pre-configured to "call home" to configuration system 208 in order to receive configuration information. The configuration information provided to CPE 107 may, for example, include one or more IP address(es) for the CPE 107. The configuration information may also include one or more IP address(es) for one or more provider edge router(s) 105 that the CPE 107 will use in routing outgoing traffic from customer network 104 to network 101. In some examples, the configuration information is stored by customer information system 204 and/or circuit information system 206.

As discussed, using ordering system 202, the customer may order a new Internet circuit 103. The ordering system 202 may be available to automated processes through an application programming interface (API). In some examples, the ordering system 202 may also provide the customer a simple option to order a DNS firewall service for the new Internet circuit 103. For example, in the same user interface used to order the Internet circuit 103 (e.g. a checkbox or other selectable option on the same web page presented to the customer, or a series of related web pages presented to the user before an order is submitted or equivalent actions performed through an API-based ordering system), the customer may be permitted to optionally add the DNS firewall service. In examples, the DNS firewall service (e.g., provided by DNS firewall system 108) allows the customer to restrict the domains that customer device(s) 106 are permitted to access from customer network 104.

In examples, combining the process for ordering and provisioning the new Internet circuit 103 and the DNS firewall system 108 for that circuit permits efficiencies and functionality not possible using separate ordering/provisioning processes. As a nonexclusive example, the configuration system 208 may automatically configure the CPE 107 to cause DNS requests to be directed from customer devices 106 to the DNS firewall system 108. For example, the CPE 107 may be programmed to provide a DNS firewall system IP address configuration (e.g., using Dynamic Host Configuration Protocol (DHCP) configuration settings) to the individual customer devices 106, which then will use the DNS firewall system 108 for DNS resolutions. Among other things, the CPE 107 may be automatically and remotely configured by configuration system 208 (e.g., when the CPE 107 "calls home" to receive configuration information) to configure the DNS settings in that DHCP configuration, which is then used by customer device(s) 106 to obtain an IP address advertised by the DNS firewall system 108. In some examples, remote configuration of the CPE 107 may be accomplished by sending a configuration from the configuration system 208 to the CPE 107, using an executable configuration script. The executable configuration script can be specific to the type of device that comprises CPE 107 (e.g., manufacturer, model, etc.), and it can be operable to configure the CPE 107 to apply the correct DNS firewall system IP address configuration to the customer devices 106. In some examples, the CPE 107 may also be configured by configuration system 208 to solely allow DNS requests from customer device(s) 106 if such requests are directed to the DNS firewall system 108 for DNS resolution, thereby reducing the risk for some of the techniques used by customer device 106 users or malicious actors to circumvent the use of the DNS firewall system 108 for DNS resolution.

Configuration system 208 may also communicate with DNS firewall system 108 to automatically configure the customer as a new tenant of the DNS firewall service and alert the DNS firewall system 108 that DNS requests from the IP address space assigned to the new Internet circuit 103 should be filtered using the DNS firewall service. In some examples, the configuration system 208 does not directly configure the CPE 107 to direct all DNS requests from customer device(s) 106 to the DNS firewall system 108, but instead causes an automatic process to be initiated at the DNS firewall system 108 to communicate with the CPE 107 and cause such configuration to occur. In other examples, the CPE 107 may not be managed by the provider of network 101. As such, configuration system 208 may instead cause a notification to be sent to the customer with instructions for how to configure the CPE 107 in order to direct all DNS requests from customer device(s) 106 to the DNS firewall system 108.

Figure 3:
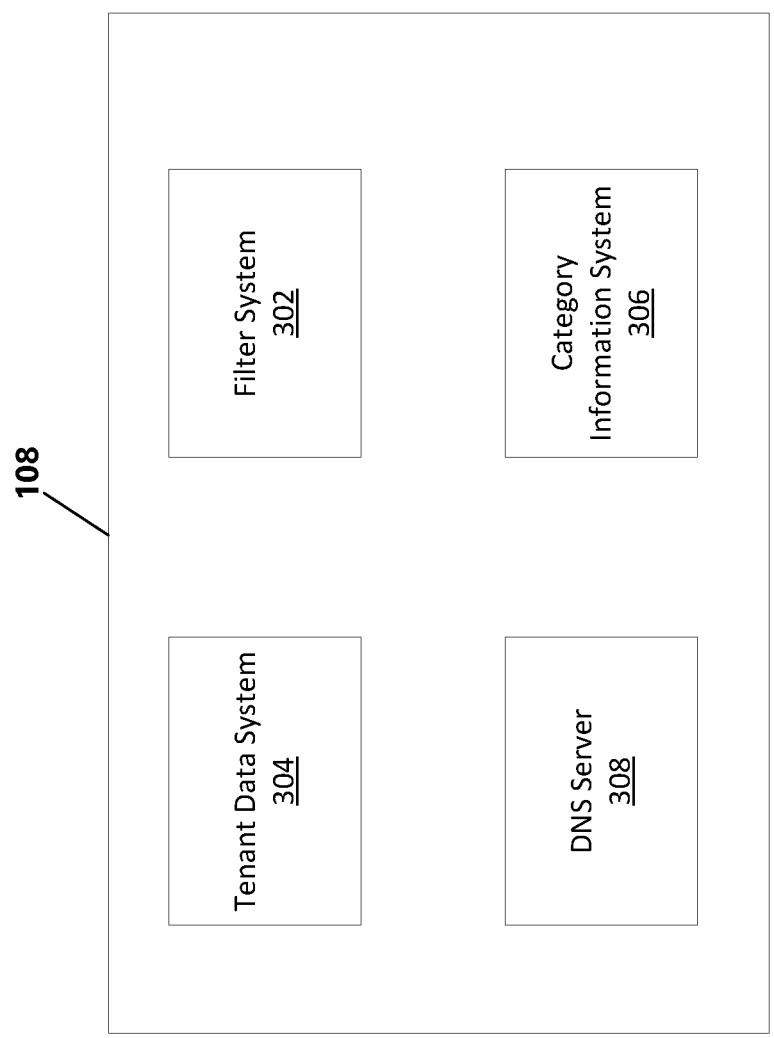
FIG. 3 is a block diagram depicting an example implementation of the DNS firewall system of FIG. 1.

An example DNS firewall system 108 (used to provide the DNS firewall service) is described with respect to FIG. 3. In some examples, the DNS firewall system is collocated with provider edge router 105, e.g., at an edge computing site of network 101. In examples, DNS firewall system may comprise a filter system 302, tenant data system 304, category information system 306, and DNS server 308. Filter system 302 may, for example, be configured to reject DNS requests that are directed to domains that are not permitted to be accessed by customer device(s) 106 on customer network 104. In examples, rejecting a DNS request may comprise dropping the request (not resolving the domain in the request to an IP address) and returning a notification to the customer device(s) 106 (through CPE 107) indicating that the domain sought to be reached by the customer device(s) 106 is not permitted pursuant to rules of the customer network 104. In other example, rejecting the DNS request may comprise resolving the domain to an IP address not for the requested site, but for a site that displays such notification.

Tenant data system 304 may store, or be configured to retrieve from one or more other network systems, tenant information about tenants of the DNS firewall system 108. In examples, the tenant information may comprise portions of the customer information received from provider configuration system 102 when a new Internet circuit 103 is ordered with DNS firewall service. For example, tenant information stored (or retrievable) by tenant data system 304 may include customer name and location, customer contact information, a type of equipment that comprises the CPE 107, and the IP address space assigned to the Internet circuit(s) 103 for that customer and for which the DNS firewall service has been subscribed. Tenant data may also include tenant configuration information for the particular customer regarding the domains (or categories of domains) for which DNS requests should be rejected (or allowed) by filter system 302.

In some examples, the tenant data system 304 receives a request from provider configuration system 102 when a new Internet circuit 103 is ordered along with the DNS firewall service for that circuit. In examples, the tenant data system 304 automatically extracts customer information from the received request and (if the customer is not already a tenant of the DNS firewall system 108), automatically provisions the customer as a new tenant. In examples, the request from provider configuration system 102 also includes the IP address space associated with the new Internet circuit. The tenant data system 304, in examples, stores the IP address space in association with the newly created tenant (based on the customer information) or with previously stored tenant information (if the customer is already a tenant).

In addition, the request from the provider configuration system 102 also causes the tenant data system 304 to initiate a configuration process for the DNS firewall service. For example, the tenant data system 304 may use the customer contact information included in the request from provider configuration system to send a message (e.g., an email) to initiate a process by which the customer chooses categories of domains for which DNS requests will be rejected by filter system 302. In examples, the tenant data system 304 will provide a user interface (e.g., selectable via a link in an email to the customer) to turn filtering on or off for particular categories of domains. In other examples, such link may direct the customer to a portal in a control center associated with the DNS firewall system 108. In other examples, the customer may separately navigate to such control center for customization of the DNS firewall service configuration. In other examples, the customer utilize an API associated with the DNS firewall system 108 for customization of the DNS firewall service configuration. In examples, the tenant data system 304 will provide default selections (e.g., based on majority preferences of other DNS firewall service tenants, or otherwise) and use the default selections in the absence of other instructions from the customer. In some examples, all customers are provided with such default selections as a starting point in the user interface of the tenant data system 304 from which the customer can then customize its particular selections for filtering. The user interface presented by tenant data system 304 may, in examples, also allow customers to specifically designate certain domains on access-allowed lists and access-denied lists, each of which may override decisions that would otherwise be made on category information. Tenant configuration data stored in the tenant data system 304 may specify the domains or categories of domains for which DNS request should be filtered (or permitted). Tenant configuration data may be applied for all Internet circuits of the tenant. In other examples, the tenant configuration data may be specific to particular Internet circuit(s) of a tenant, groups of end-users, and individual end-users of the tenant.

In examples, the filter system 302 and tenant data system 304 may coordinate with a category information system 306, which may be store, or be configured to retrieve from one or more other network systems, current information about domain categories. For example, category information system 306 may store lists of known domain names and may associate one or more categories with such domain names. For example, a domain example1.com may be categorized in category information system 306 as a social media site, while another domain example2.com may be categorized as a video streaming site. In some instances, a particular domain may be associated with multiple categories.

Category information system 306 may receive (or retrieve) data from third-party service(s) and may be continually updated as new sites are added or discovered. In examples, category information system 306 may communicate with threat intelligence system 110. The threat intelligence system 110 may maintain a list of known malicious sites. Such list may be separately used by the threat intelligence system 110 (e.g., in conjunction with other network elements of a threat mitigation system) to mitigate the effect of such sites (e.g., by dropping any packets received from source IP addresses associated with such sites). The threat intelligence system 110 may provide its list of known malicious sites to the category information system 306. If threat intelligence system 110 identifies particular domains as participating in malicious activity on network 101, the category information system 306 may create a category of known malicious domains and associate the domains with that category that are so identified by the threat intelligence system 110. The tenant data system 304 may, by default, store configuration data selecting the category of known malicious domains for filtering out (rejection) by filter system 302. In some examples, the known malicious domains category is not de-selectable for filtering by the customer through the user interface presented by tenant data system 304. As discussed, however, in some examples, a customer may specifically add particular domains to an access-allowed list (and override any category determinations). In some examples, the tenant data system 304 and/or category information system 306 may cooperate to alert the threat intelligence system 110 when a particular number or percentage of customers have added a domain that appears in the known malicious domains category to an access-allowed list. In some examples, this permits the threat intelligence system 110 (through automation or an administrator thereof) to review the site to determine whether it should remain on the known malicious domains list at the threat intelligence system 110. In other examples, the DNS firewall system 108 may communicate other filtering information to threat intelligence system 110, such as when a particular number or percentage of tenants have added a domain to an access-denied list, log information indicating a frequency at which DNS request are being rejected (and information about the particular domains or categories for which DNS requests are being rejected), etc.

In some examples, the DNS firewall system 108 may also include a DNS server 308. For example, DNS server 308 may operate as a DNS recursor to communicate with DNS root servers, top-level domain server, and/or authoritative name servers (and related caches or other devices) in order to resolve any DNS request that is not filtered out by filter system 302. As an example, if a DNS request to resolve www.example.com is received by DNS firewall system from CPE 107 through provider edge router 105, the filter system 302 may extract the domain (example.com) from the DNS request and query category information system 304 for the all of the categories with whichexample.com is associated. Filter system 302 may also query tenant information system to determine (a) whether the IP address space from which the DNS request was received is currently associated with a tenant of the DNS firewall service; and (b) if so, whether the tenant information indicates that domains for any of identified categories are subject to filtering for the identified tenant. If the filter system 302 determines that the DNS request should not be filtered (rejected), it may pass the request to the DNS server 308 for resolution to an IP address for the requested domain. In other examples, the DNS firewall system 108 does not include a dedicated DNS server, and the filter system 302 may pass any the DNS request that is not rejected to a separate DNS server 111.

In addition, in some examples, the CPE 107 may be configured to send DNS requests to the DNS firewall system 108, but the customer may eventually discontinue DNS firewall service for the particular Internet circuit 103. In some examples, the tenant data system 304 may communicate with configuration system 208 to automatically reconfigure CPE 107 to address outgoing DNS requests to an IP address not associated with DNS firewall system 108. In other examples, however, the CPE 107 may not be automatically (or otherwise) reconfigured and may continue sending DNS requests to DNS firewall system 108. In some examples, the filter system 302 may (a) receive the request; (b) determine that the Internet circuit 103 is no longer associated with a tenant of the DNS firewall service; and (c) either reject the DNS request or forward the request to a different DNS server, such as DNS server 111. In some examples, the filter system 302 may also notify the customer that DNS requests are being rejected and that CPE 107 needs to be reconfigured to address DNS request elsewhere. In some examples, the filter system 302 may forward such DNS requests to DNS server 111 only for a certain period of time following termination of DNS firewall service for the Internet circuit 103, after which time such DNS requests may be dropped. In some examples, the notification(s) to the customer may include an amount of time remaining before such DNS requests will start to be rejected without the CPE 107 being reconfigured to address DNS requests to a different DNS server (such as DNS server 111).

Figure 4:
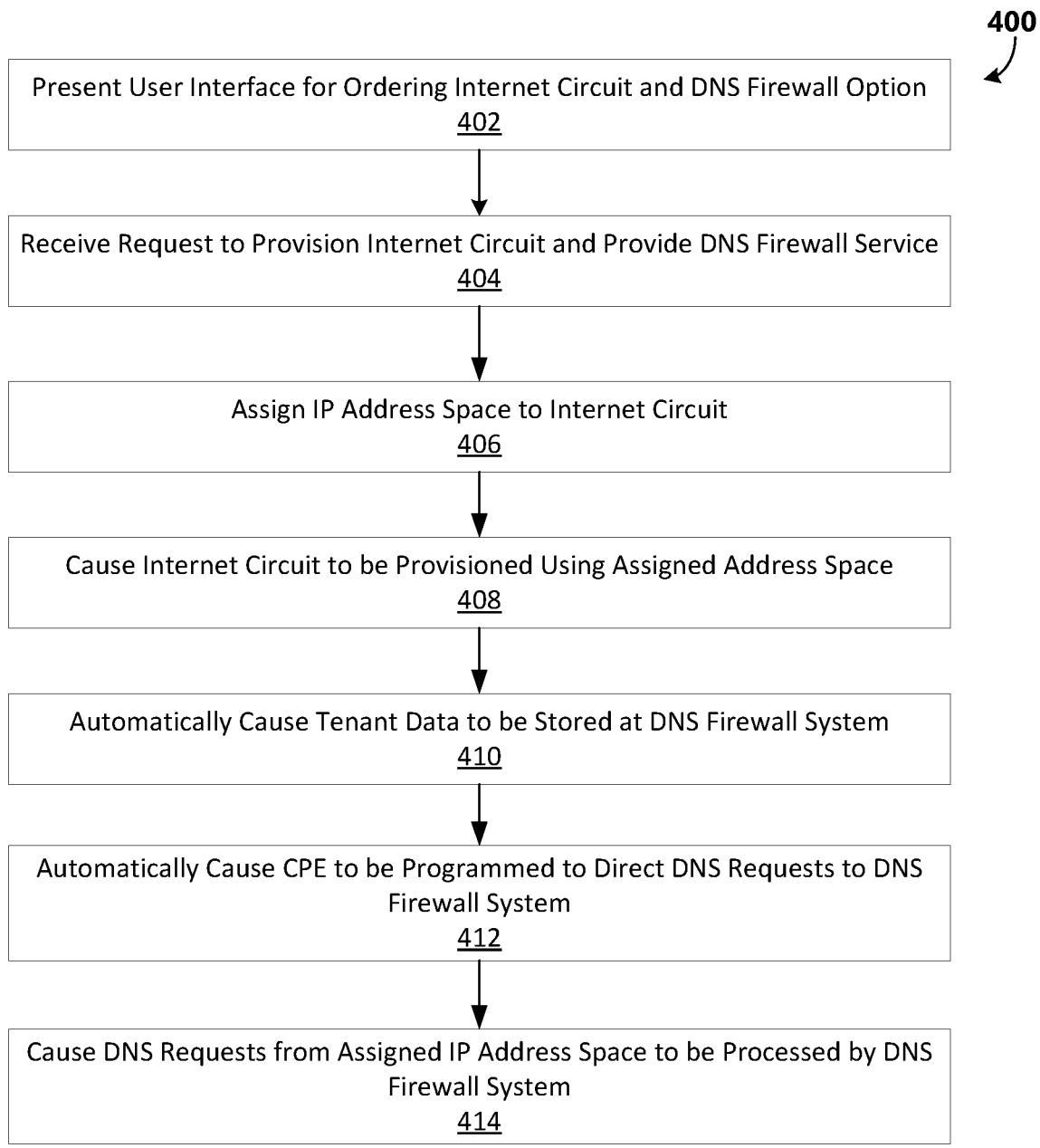
FIG. 4 is a flow chart depicting an example method according on aspects of the present application.

An example method 400 in accordance with the present application is described with respect to FIG. 4. In examples, some or all of the operations of method 400 are performed by provider configuration system 102. At operation 402, a user interface is presented for ordering an Internet circuit and a DNS firewall service. For example, the ordering system 202 may cause a user interface to be displayed on customer device(s) 106. The user interface may include a web page (or series of related web pages) that allow the customer to submit an order for a new Internet circuit 103 to connect a customer network 104 to the Internet 109. The user interface for ordering the Internet circuit 103 may also include an option (e.g., a check box or other selectable user interface element) to select a DNS firewall service for the newly ordered Internet circuit 103. The user interface may also be exposed in a form of an API allowing for automation in ordering the service.

At operation 404, a request to provision the Internet circuit and provide the DNS firewall service is received. For example, the ordering system 202 may receive an indication through the user interface that the customer has submitted its order for the Internet circuit 103 and associated DNS firewall service. In examples, this may comprise receiving selection of a selectable user interface element, such as a "submit" button or otherwise.

At operation 406, an IP address space is assigned to the Internet circuit. For example, configuration system 208 may assign an IP address space to the Internet circuit 103 (e.g., assigning a first IP address of the assigned IP address space to the CPE 107 and a second IP address of the assigned IP address space to the provider edge router 105).

Flow proceeds to operation 408, where the Internet circuit is caused to be provisioned using the assigned IP address space. For example, the configuration system 208 may cooperate with the circuit information system 206 to determine the most advantageous way to provision the new Internet circuit 103. For example, configuration system 208 may, in examples, identify one or more available port(s) on an existing provider edge router 105 for the new Internet circuit 103. In other examples, the configuration system 208 may determine that a new provider edge router 105 should be added to network 101 (either in a new location or at an existing location) in order to accommodate the new Internet circuit 103. Configuration system 208 may also cause one or more workflows to be initiated to cause technicians to design or implement the new Internet circuit 103. In examples, configuration system 208 may automatically cause the provider edge router(s) 105 to be configured to advertise, e.g., the IP addresses of the assigned IP address space.

In examples, configuration system 208 may also cause CPE 107 to be automatically configured. For example, if the provider of network 101 is also providing the CPE 107 to the customer as part of the order for the new Internet circuit 103, the CPE 107 may be pre-configured to "call home" to configuration system 208 in order to receive configuration information. The configuration information provided to CPE 107 may, for example, include one or more IP address(es) for the CPE 107 to advertise. The configuration information may also include one or more IP address(es) for one or more provider edge router(s) 105 that the CPE 107 will use in routing outgoing traffic from customer network 104 to network 101.

At operation 410, tenant data is automatically caused to be stored at a DNS firewall system. For example, provider configuration system 102 may automatically send a request to the DNS firewall system 108 to store tenant data in tenant data system 304. In examples, the tenant data may comprise some or all of the customer information received by the provider configuration system 102 during the ordering of a new Internet circuit 103, such as identification of the customer, customer location, and customer contact information. Tenant data included in the request from the provider configuration system 102 may also include the IP address space(s) assigned to the Internet circuit 103, identification of the CPE 107 (and/or type of device that comprises the CPE 107), and other information.

At operation 412, the CPE is automatically caused to be programmed to direct DNS requests to the DNS firewall system. For example, the configuration system 208 may automatically configure the CPE 107 to work with the DNS firewall system 108. Among other things, the CPE 107 may be automatically configured by configuration system 208 when the CPE 107 "calls home" to receive configuration information. As a nonexclusive example, the configuration system 208 may automatically configure the CPE 107 to cause DNS requests to be directed from customer devices 106 to the DNS firewall system 108. For example, the CPE 107 may be programmed to provide a DNS firewall system IP address configuration (e.g., using DHCP configuration settings) to the individual customer devices 106, which then will use the DNS firewall system 108 for DNS resolutions. In some examples, remote configuration of the CPE 107 may be accomplished by sending a configuration from the configuration system 208 to the CPE 107, using an executable configuration script. The executable configuration script can be specific to the type of device that comprises CPE 107 (e.g., manufacturer, model, etc.), and it can be operable to configure the CPE 107 to apply the correct DNS firewall system IP address configuration to the customer devices 106. In some examples, the configuration system 208 does not directly configure the CPE 107 to direct all DNS requests from customer device(s) 106 to the DNS firewall system 108, but instead causes an automatic process to be initiated at the DNS firewall system 108 to communicate with the CPE 107 and cause such configuration to occur. In other examples, the CPE 107 may not be managed by the provider of network 101. As such, configuration system 208 may instead cause a notification to be sent to the customer with instructions for how to configure the CPE 107 in order to direct all DNS requests from customer device(s) 106 to the DNS firewall system 108. In some examples, the CPE 107 may also be configured by configuration system 208 to solely allow DNS requests from customer device(s) 106 if such requests are directed to the DNS firewall system 108 for DNS resolution, thereby reducing the risk for some of the techniques used by customer device 106 users or malicious actors to circumvent the use of the DNS firewall system 108 for DNS resolution.

At operation 414, DNS requests from the assigned IP address space are caused to be processed by the DNS firewall system. For example, configuration system 208 may communicate with DNS firewall system 108 to automatically configure the customer as a new tenant of the DNS firewall service and alert the DNS firewall system 108 that DNS requests from the IP address space assigned to the new Internet circuit 103 should be filtered using the DNS firewall service. In examples, if the customer is already a tenant of the DNS firewall system 108, the configuration system 208 may cause the DNS firewall system 108 to associate the new Internet circuit with the existing tenant account at the DNS firewall system 108 for that customer. DNS requests on Internet circuit 103 are then processed by the DNS firewall system 108, as discussed, unless and until the DNS firewall service is no longer subscribed to for that Internet circuit by the customer.

Figure 5:
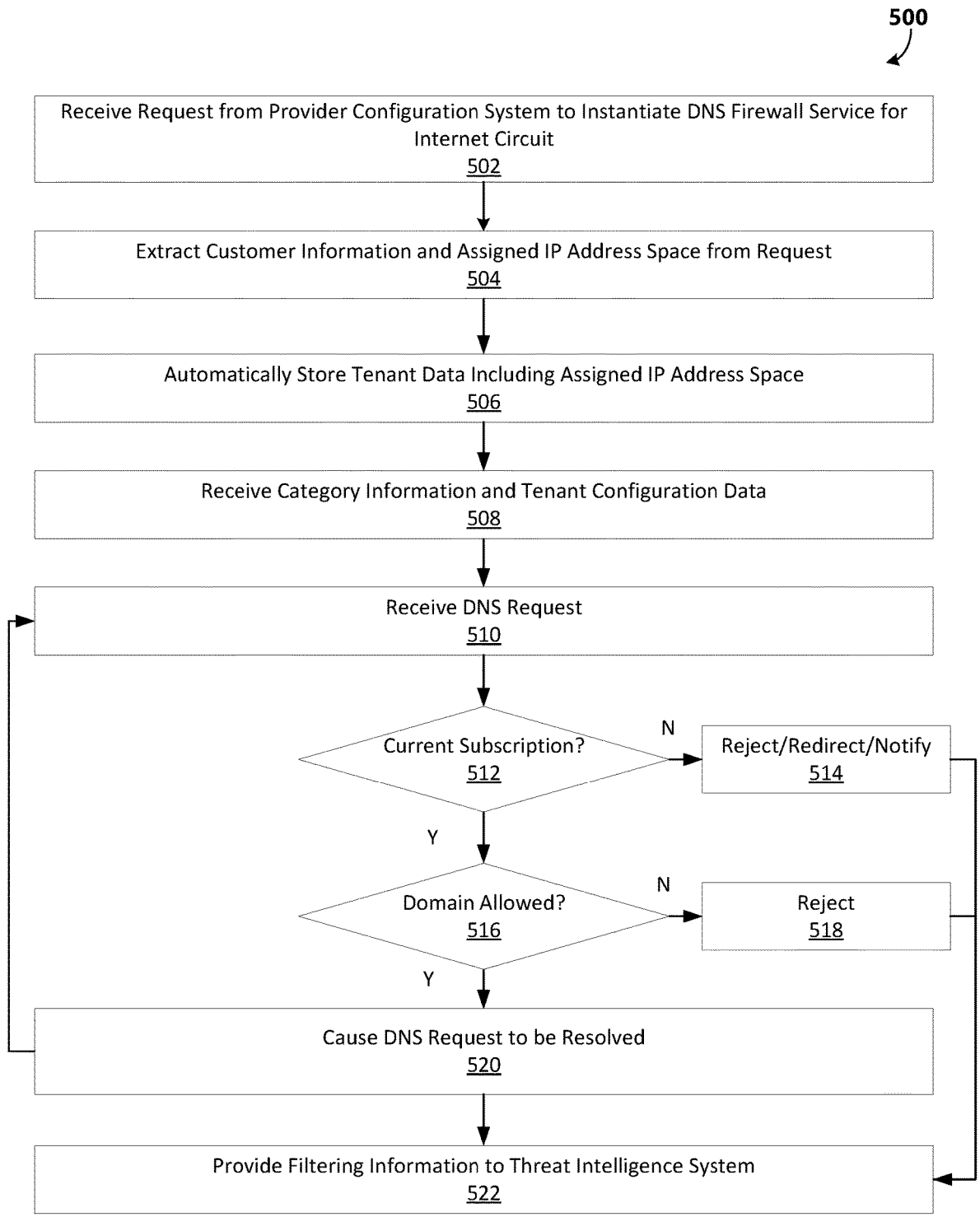
FIG. 5 is a flow chart depicting an example method according on aspects of the present application.

An example method 500 in accordance with the present application is described with respect to FIG. 5. In examples, some or all of the operations of method 500 are performed by DNS firewall system 108. Flow begins at operation 502, where a request from a provider configuration system is received to instantiate a DNS firewall service for an Internet circuit. For example, a request may be received at DNS firewall system 108 from provider configuration system 102 to provide a DNS firewall service for DNS requests received from an IP address space assigned to Internet circuit 103.

Flow proceeds to operation 504, where customer information and an assigned IP address space are extracted from the request received at operation 502. Extracted customer information may include customer name and location, and customer contact information. Other information extracted from the request may include a type of equipment that comprises the CPE 107, and the IP address space assigned to the Internet circuit(s) 103 for that customer and for which the DNS firewall service has been subscribed. In some examples, the tenant data system 304 receives the request from provider configuration system 102 when a new Internet circuit 103 is ordered along with the DNS firewall service for that circuit. In examples, the tenant data system 304 automatically extracts customer information from the received request and (if the customer is not already a tenant of the DNS firewall system 108), automatically provisions the customer as a new tenant.

At operation 506, tenant data is automatically stored, including the assigned IP address space. For example, the customer information and other information extracted at operation 504 may be stored as tenant data in tenant data system 304. For example, the tenant data system 304 may store the IP address space in association with the newly created tenant (based on the customer information) or with previously stored tenant information (if the customer is already a tenant).

At operation 508, category information and tenant configuration data are received. For example, as discussed, category information system 306 may receive information about known domains and one or more categories associated with such domains. Further, tenant information system 304 may receive tenant configuration data specifying whether certain domains or categories of domains are subject to filtering by filtering system 302 for the tenant (or for particular Internet circuit(s) 103 of the tenant). As discussed, the tenant configuration data may comprise default configurations set by the provider of network 111 unless and until altered by the customer.

At operation 510, a DNS request is received. For example, DNS firewall system 108 may receive a DNS request due to the use of a browser operating on a customer device 106 through CPE 107 and provider edge router 105. The DNS request may comprise a request to resolve a domain name (e.g., www.example.com) into a routable IP address for a desired web resource.

At operation 512, a decision is made whether a currently applicable subscription to the DNS firewall service exists for the request. For example, DNS firewall system 108 may extract information from the request regarding the IP address space of the Internet circuit 103 on which the request was received. If the IP address space of the Internet circuit 103 is determined not to be associated with a current tenant of the DNS firewall service (e.g., by query to the tenant data system 304), flow proceeds "no" to operation 514, where the DNS request is rejected or redirected, and a notification to the customer may be provided. In some examples, at operation 514, the DNS request is simply dropped. In other examples, the DNS request may be redirected to a web page indicating that the DNS request cannot be completed and that the CPE 107 needs to be reconfigured to point DNS requests to a different DNS server. Further, in some examples, at operation 514, the DNS request may be redirected automatically to a different DNS server 111, and a notification may be provided to the customer that the CPE 107 needs to be reconfigured to point DNS requests to a different DNS server. In some examples, the redirection to the different DNS server 111 may take place only for a certain period of time after the customer (or particular Internet circuit of the customer) ceases being subscribed to the DNS firewall service, and the notification to the customer may indicate an amount of time remaining in such period prior to the DNS requests simply being rejected.

If, at operation 512, it is determined that a current subscription to the DNS firewall service does apply to the Internet circuit on which the DNS request is received, then flow proceeds "yes" to operation 516. At operation 516, a determination is made whether the domain in the DNS request is allowed to be resolved for that Internet circuit. For example, filter system 302 may query category information system 306 to determine one or more categories with which the domain is associated (e.g., social media, video streaming, news, sports, etc.). Filter system 302 may also query tenant data system 304 to determine, for the tenant associated with the Internet circuit on which the DNS request was received, whether any of the categories with which the domain is associated are prohibited. As discussed, in some examples, a tenant may define one set of category rules to apply for allow/reject decisions for all Internet circuits of that tenant; and in other examples, the rules may be specific to one or more particular Internet circuits for that tenant. In addition, in some examples, a tenant may also define an "access-allowed list" of domains that are always permitted to be resolved on that Internet circuit, regardless of category, and a "access-denied list" of domains that area always prohibited from being resolved on that Internet circuit, regardless of category.

If, at operation 516, a determination is made that the domain is not allowed, then flow proceeds "no" to operation 518, where the DNS request is rejected. In examples, rejecting a DNS request may comprise dropping the request (and not resolving the domain in the request to an IP address) and returning a notification to the customer device(s) 106 (through CPE 107) indicating that the domain sought to be reached by the customer device(s) 106 is not permitted pursuant to rules of the customer network 104. In other examples, rejecting the DNS request may comprise resolving the domain to an IP address not for the requested site, but for a landing site that displays such notification. In the latter case, the IP address for the landing site is returned to the customer device 106 through the CPE 107.

If, at operation 516, a determination is made that the domain is allowed, then flow proceeds "yes" to operation 520, where the DNS request is caused to be resolved. For example, if the filter system 302 determines that the domain in the DNS request is allowed, it may forward the DNS request to the DNS server 308. DNS server 308 may operate as a DNS recursor to communicate with DNS root servers, top-level domain server, and/or authoritative name servers (and related caches or other devices) in order to resolve any DNS request that is not filtered out by filter system 302. In other examples, the DNS firewall system 108 does not include a dedicated DNS server, and the filter system 302 may pass any the DNS request that is not rejected to a separate DNS server 111. Once the DNS server (e.g., DNS server 308 or DNS server 111) determines the IP address for the requested domain, it may be returned to the customer device 106 through the CPE 107. Flow then proceeds back to operation 510, where an additional DNS request may be received, and operations 510 through 520 may repeat, as necessary.

In addition, in examples, flow may proceed from any or all of operations 514, 518, and 520 to operation 522, where filtering information may be returned to a threat intelligence system. For example, a customer may specifically add particular domains to an access-allowed list (and override any category determinations). In some examples, the tenant data system 304 and/or category information system 306 may cooperate to alert the threat intelligence system 110 when a particular number or percentage of customers have added a domain that appears in the known malicious domain category to an access-allowed list. In some examples, this permits the threat intelligence system 110 (through automation or an administrator thereof) to review the domain to determine whether it should remain on the known malicious domains list at the threat intelligence system 110. In other examples, the DNS firewall system 108 may communicate other filtering information to threat intelligence system 110, such as when a particular number or percentage of tenants have added a domain to an access-denied list, log information indicating a frequency at which DNS request are being rejected (and information about the particular domains or categories for which DNS requests are being rejected), etc. In examples, updates by the DNS firewall system 108 to the threat intelligence system 110 can occur after every DNS allow/reject decision, periodically on a regular schedule, only upon certain thresholds being met for the number of DNS requests or for the number/percentage of such requests being rejected for particular reasons, or otherwise.

Figure 6:
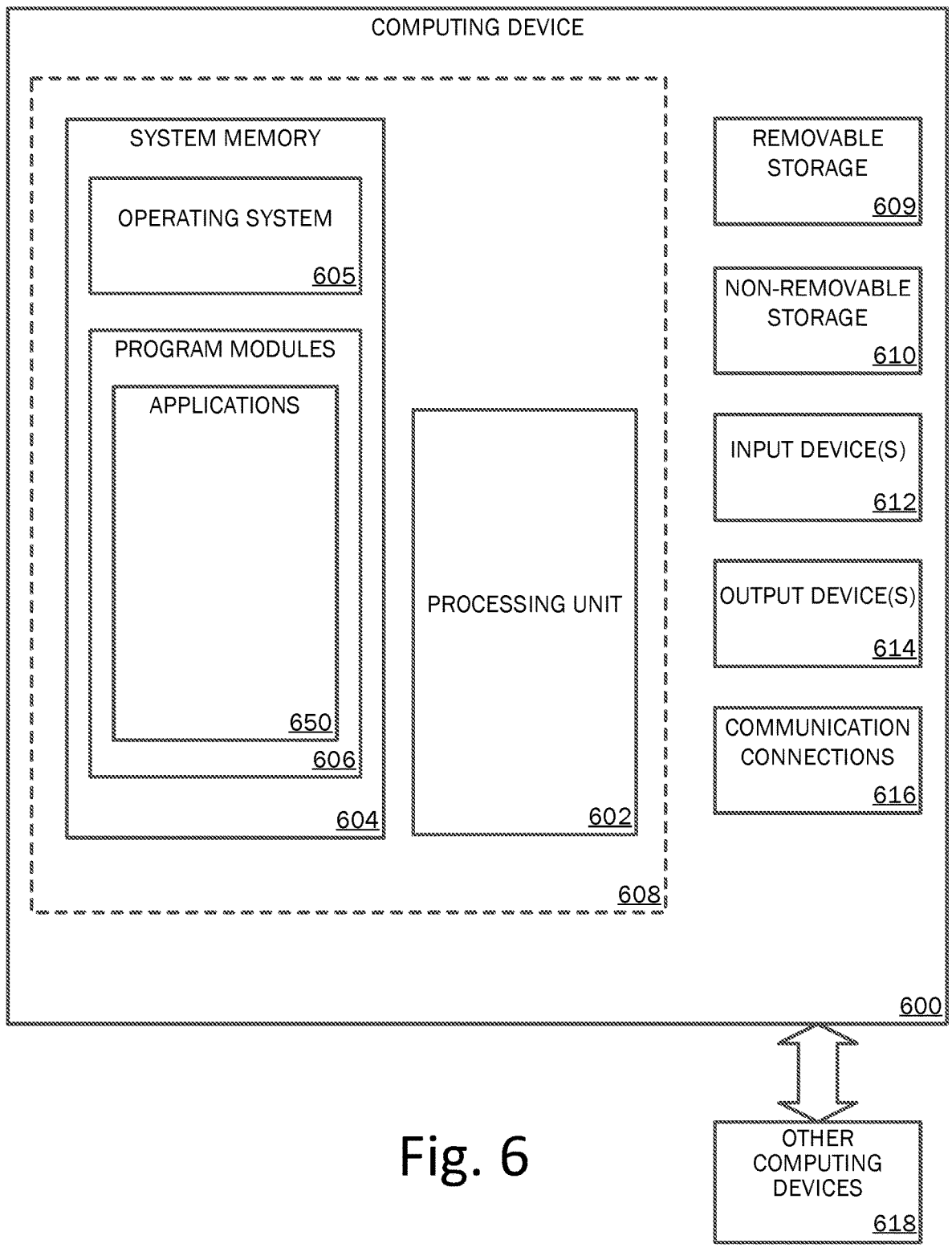
FIG. 6 is a block diagram depicting an example computing environment in which systems and methods of the present application can be implemented.

FIG. 6 is a block diagram illustrating physical components (i.e., hardware) of a computing device 600 with which examples of the present disclosure may be practiced. The computing device components described below may be suitable for a client device implanting one or more of the provider configuration system 102, the DNS firewall system 108, or other components of FIGS. 1-3. In a basic configuration, the computing device 600 may include at least one processing unit 602 and a system memory 604. The processing unit(s) (e.g., processors) may be referred to as a processing system. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 650 to implement one or more of the systems described above with respect to FIGS. 1-3.

The operating system 605, for example, may be suitable for controlling the operation of the computing device 600. Furthermore, aspects of the invention may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 may perform processes including, but not limited to, one or more of the operations of the methods illustrated in FIGS. 4-5. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 600 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media may be non-transitory and tangible and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
   receiving, from a provider configuration system of a network and at a domain name system (DNS) firewall system, a request to instantiate the DNS firewall system for an Internet circuit, wherein the request comprises customer information and an assigned Internet protocol (IP) address space for the Internet circuit;
   automatically extracting the customer information and the assigned IP address space from the request;
   automatically storing tenant data for the customer at the DNS firewall system, wherein the tenant data comprises at least the assigned IP address space;
   receiving, by the DNS firewall system, a first DNS request from the assigned IP address space;
   processing, by the DNS firewall system, the first DNS request, wherein the processing comprises:
      determining that the first DNS request includes a first domain that is in a first category;
      determining whether the first category is permitted for the customer;
      when the first category is permitted for the customer, causing the first DNS request to be resolved to a first IP address associated with the first domain; and
      when the first category is not permitted for the customer, causing the first DNS request to be rejected;
   receiving, by the DNS firewall system, a second DNS request from the assigned IP address space;
   determining, by the DNS firewall system, that the customer is not currently subscribed to the DNS firewall system for the Internet circuit; and
   forwarding, by the DNS firewall system, the second DNS request to a separate DNS system.

2. The method of claim 1, further comprising reporting, by the DNS firewall system, filtering information to a threat intelligence system.

3. The method of claim 2, wherein the filtering information comprises information regarding any domains that the customer has included on at least one of an access-allowed list or an access-denied list.

4. The method of claim 2, further comprising receiving, from the threat intelligence system, a list of known malicious domains, wherein the first category comprises the list of known malicious domains and wherein the DNS firewall system automatically prohibits the first category from being permitted for the customer.

5. The method of claim 1, wherein the separate DNS system is associated with a second IP address, the method further comprising, when the customer is not currently subscribed to the DNS firewall system for the Internet circuit, sending a notification to the customer to instruct the customer to change an IP address at customer premises equipment to the second IP address.

6. The method of claim 1, further comprising, when the customer is not currently subscribed to the DNS firewall system for the Internet circuit, forwarding the second DNS request to a separate DNS system only if the second DNS request is received during a predefined period since the customer was last subscribed to the DNS firewall system and, otherwise, discarding the second DNS request.

* * * * *